(12) United States Patent
Zhou et al.

(10) Patent No.: US 10,841,020 B2
(45) Date of Patent: Nov. 17, 2020

(54) ONLINE SELF-CORRECTION ON MULTIPLE DATA STREAMS IN SENSOR NETWORKS

(71) Applicant: SAP SE, Walldorf (DE)

(72) Inventors: Wenjun Zhou, Shanghai (CN);
Wen-Syan Li, Fremont, CA (US)

(73) Assignee: SAP SE, Walldorf (DE)

( * ) Notice: Subject to any disclaimer, the term of this patent is extended or adjusted under 35 U.S.C. 154(b) by 395 days.

(21) Appl. No.: 15/885,188

(22) Filed: Jan. 31, 2018

(65) Prior Publication Data

US 2019/0238241 A1    Aug. 1, 2019

(51) Int. Cl.

| | | |
|---|---|---|
| *H04B 17/21* | (2015.01) | |
| *G05B 23/02* | (2006.01) | |
| *G01D 18/00* | (2006.01) | |
| *G01D 21/00* | (2006.01) | |
| *G01D 3/036* | (2006.01) | |
| *G01D 3/02* | (2006.01) | |
| *H04W 84/18* | (2009.01) | |
| *H04L 29/08* | (2006.01) | |

(52) U.S. Cl.
CPC ............ *H04B 17/21* (2015.01); *G01D 3/022* (2013.01); *G01D 3/036* (2013.01); *G01D 18/006* (2013.01); *G01D 21/00* (2013.01); *G05B 23/0264* (2013.01); *H04L 67/12* (2013.01); *H04W 84/18* (2013.01)

(58) Field of Classification Search
CPC ...... G01D 18/006; G01D 21/00; G01D 3/022; G01D 3/036; G05B 23/0264; G05B 23/0221; H04B 17/21; H04L 67/12; H04W 84/18
See application file for complete search history.

(56) References Cited

U.S. PATENT DOCUMENTS

| | | |
|---|---|---|
| 5,524,077 A | 6/1996 | Faaland et al. |
| 7,089,071 B2 | 8/2006 | Lilly et al. |
| 7,246,009 B2 | 7/2007 | Hamblen et al. |
| 7,660,651 B2 | 2/2010 | Zhong |
| 7,719,416 B2 * | 5/2010 | Arms ................... B64C 27/006 307/151 |
| 8,069,086 B2 | 11/2011 | von Helmolt et al. |
| 8,140,592 B2 | 3/2012 | Scott et al. |

(Continued)

OTHER PUBLICATIONS

U.S. Appl. No. 14/050,833, Li et al., filed Oct. 10, 2013.

(Continued)

*Primary Examiner* — Elias Desta
(74) *Attorney, Agent, or Firm* — Fish & Richardson P.C.

(57) ABSTRACT

Implementations of the present disclosure include methods, systems, and computer-readable storage mediums for receiving a first current detected data value for a first sensor of a sensor network including multiple sensors, determining a first predicted data value based on historical data values of the first sensor, and a second predicted data value based on a second current detected data value for a second sensor, providing a combined predicted data value based on the first predicted data value, and the second predicted data value, comparing the first current detected data value and the combined predicted data value to provide a comparison, and determining a first corrected data value for the first sensor.

20 Claims, 4 Drawing Sheets

(56) References Cited

U.S. PATENT DOCUMENTS

| | | |
|---|---|---|
| 8,219,546 B2 | 7/2012 | Yan et al. |
| 8,306,838 B2 | 11/2012 | Heise et al. |
| 8,332,390 B2 | 12/2012 | Yan et al. |
| 8,612,180 B2 | 12/2013 | Yan et al. |
| 8,650,340 B2 | 2/2014 | Yan et al. |
| 8,660,949 B2 | 2/2014 | Li et al. |
| 8,744,888 B2 | 6/2014 | Li et al. |
| 8,775,397 B2 | 7/2014 | Dong et al. |
| 8,788,501 B2 | 7/2014 | Li et al. |
| 8,868,497 B2 | 10/2014 | Yan et al. |
| 8,914,802 B2 | 12/2014 | Li et al. |
| 9,135,432 B2 * | 9/2015 | Roesch .............. H04L 63/1416 |
| 2003/0004747 A1 | 1/2003 | Burton |
| 2003/0060924 A1 | 3/2003 | Ye et al. |
| 2007/0239297 A1 | 10/2007 | Degbotse et al. |
| 2007/0263546 A1 * | 11/2007 | Chowdhury ............ H04L 43/50 370/242 |
| 2010/0325281 A1 | 12/2010 | Li et al. |
| 2011/0173042 A1 | 7/2011 | Riepshoff et al. |
| 2012/0066019 A1 | 3/2012 | Hinshaw et al. |
| 2013/0066455 A1 | 3/2013 | Li et al. |
| 2013/0117752 A1 | 5/2013 | Li et al. |
| 2014/0019186 A1 | 1/2014 | Li et al. |
| 2014/0067601 A1 | 3/2014 | Li et al. |
| 2014/0101024 A1 | 4/2014 | Li et al. |
| 2014/0279662 A1 | 9/2014 | Wang et al. |
| 2014/0379520 A1 | 12/2014 | Nemery et al. |
| 2014/0379638 A1 | 12/2014 | Li et al. |
| 2015/0002304 A1 | 1/2015 | Sun et al. |
| 2015/0006292 A1 | 1/2015 | Li et al. |
| 2015/0006553 A1 | 1/2015 | Li et al. |

OTHER PUBLICATIONS

U.S. Appl. No. 14/055,565, Li et al., filed Oct. 16, 2013.
U.S. Appl. No. 14/465,239, Wang et al., filed Aug. 21, 2014.
U.S. Appl. No. 14/532,330, Cheng et al., filed Nov. 4, 2014.
U.S. Appl. No. 14/567,458, Wu et al., filed Dec. 11, 2014.
U.S. Appl. No. 15/360,577, Zhou et al., filed Nov. 26, 2016.

* cited by examiner

ONLINE SELF-CORRECTION ON MULTIPLE DATA STREAMS IN SENSOR NETWORKS

BACKGROUND

Sensor networks can include multiple sensors that can communicate with one another, and/or one or more back-end systems. Some such sensor networks can be referred to as Internet-of-Things (IoT) networks, which can be described as a network of physical devices embedded with electronics, software, sensors, and network connectivity. The physical devices are able to connect and exchange data with each other, and an IoT gateway. Each physical device is uniquely identifiable, and is able to inter-operate within the existing network infrastructure (e.g., the Internet).

In sensor networks, each sensor monitors a specific parameter (e.g., temperature, humidity, light intensity, atmospheric pressure, velocity, acceleration). For example, a first sensor may monitor a first parameter (e.g., temperature) at a location, and a second sensor may monitor a second parameter (e.g., pressure) at the same location. Accordingly, a sensor network can include multiple sensors with the same, or different functionalities at common locations. Sensors can provide respective data streams, and can communicate with each other over wireless networks.

Data collected from sensor can be used for various purposes (e.g., controlling a machine, performing an appropriate action, generating an alert). Consequently, the accuracy of the data is an important factor. If the collected data is inaccurate, subsequent use of the data can be flawed. It cannot be guaranteed, however, that all sensors in the sensor network always work well, and continuously collect accurate data. For example, sensor performance may degrade due to a harsh environment, wear, noise, lack of maintenance, and the like.

SUMMARY

Implementations of the present disclosure include computer-implemented methods for improving data accuracy in data streams of sensor networks. More particularly, implementations of the present disclosure are directed to self-correcting sensor networks that detect missing data, outlier data, and/or wrong calibration in data streams, and automatically correct any wrong data values, and/or fill in any missing data values.

In some implementations, actions include receiving a first current detected data value for a first sensor of a sensor network including multiple sensors, determining a first predicted data value based on historical data values of the first sensor, and a second predicted data value based on a second current detected data value for a second sensor, providing a combined predicted data value based on the first predicted data value, and the second predicted data value, comparing the first current detected data value and the combined predicted data value to provide a comparison, and determining a first corrected data value for the first sensor. Other implementations include corresponding systems, apparatus, and computer programs, configured to perform the actions of the methods, encoded on computer storage devices.

These and other implementations may each optionally include one or more of the following features: the comparison indicates whether the first current detected data value is correct, and is based on a delta threshold that is specific to the first sensor; the first corrected data value is set equal to the first current detected data value in response to determining that the comparison indicates that the first current detected data value is correct; the first corrected data value is set equal to the combined predicted data value in response to determining that the comparison indicates that the first current detected data value is one or incorrect and missing; a data stream of the second sensor is correlated to a data stream of the first sensor, and the second sensor is at a location that is different from a location of the first sensor; a gateway receives the first current detected data value from the sensor network, and determines the first corrected data value for the first sensor; and the sensor network includes a network of Internet-of-Things (IoT) devices.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include computer-implemented methods for improving data accuracy in data streams of sensor networks. More particularly, implementations of the present disclosure are directed to self-correcting sensor networks that detect missing data, outlier data, and/or wrong calibration in data streams, and automatically correct any wrong data values, and/or fill in any missing data values. In some implementations, actions can include receiving a first current detected data value for a first sensor of a sensor network including multiple sensors, determining a first predicted data value based on historical data values of the first sensor, and a second predicted data value based on a second current detected data value for a second sensor, providing a combined predicted data value based on the first predicted data value, and the second predicted data value, comparing the first current detected data value and the combined predicted data value to provide a comparison, and determining a first corrected data value for the first sensor.

Figure 1:
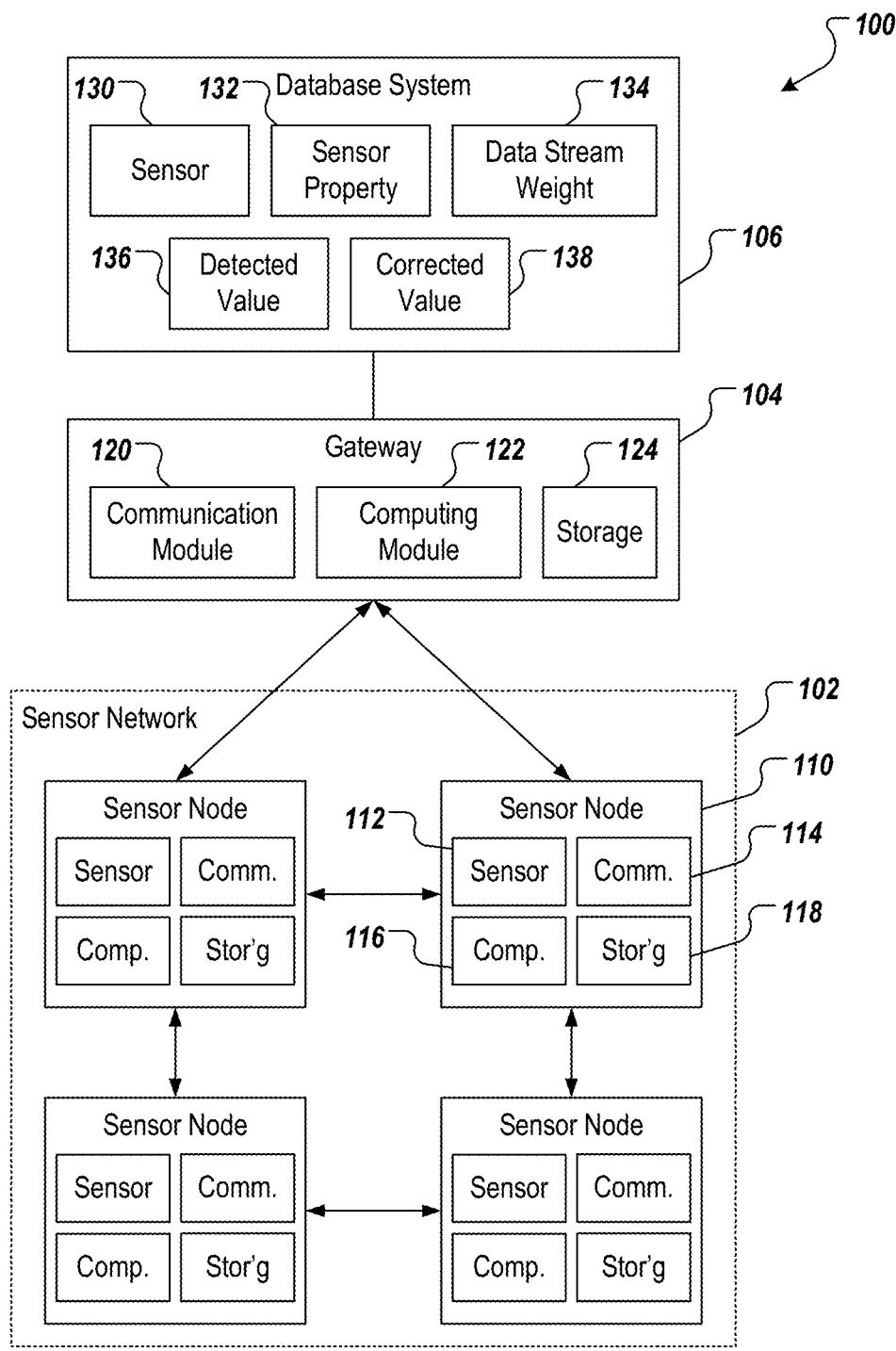
FIG. 1 depicts a conceptual diagram of an example system in accordance with implementations of the present disclosure.

FIG. 1 depicts a conceptual diagram of an example system 100 in accordance with implementations of the present disclosure. The example system 100 includes a sensor network 102, a gateway 104, and a database system 106. In the depicted example, the sensor network 102 includes a plurality of sensor nodes 110, each sensor node 110 including a sensor 112, a communication module 114, a computing module 116, and storage 118. It is appreciated that each sensor node 110 can include any appropriate components, and/or software (e.g., processor). Each sensor node 110 can be provided as at least part of an Internet-of Things (IoT) device.

Each sensor 112 is responsive to its environment, and provides data based thereon. For example, a temperature sensor can be responsive to temperature in its surrounding, and provide data that is representative of temperature. As another example, a pressure sensor can be responsive to pressure in its surroundings, and provide data that is representative of pressure. In some examples, the computing module 116 (e.g., processor) can transform the incoming data stream from a first format to a second format. In some examples, the units of the incoming data stream can be converted. For example, temperature in Celsius can be transformed (converted) to Fahrenheit. Another example, velocity in m/s can be transformed (converted) to km/h. In some examples, the storage 118 at least temporarily stores the transformed data. The storage 118 includes computer-readable/-writable memory (e.g., random access memory (RAM)). In some examples, the communication module 114 transmits the stored data to other sensor nodes 110, and/or the gateway 104.

In accordance with implementations of the present disclosure, data from the sensor network 102 is communicated through the gateway 104 to the database system 106. In some examples, as each sensor node 110 provides data, the data is streamed to the database system 106 in a respective data stream. In some examples, a data stream can include continuously provided data. This can be distinct from a batch process, in which a batch data is periodically transmitted.

In some examples, the gateway 104 is provided as an IoT gateway. In the depicted example, the gateway 104 includes a communication module 120, a computing module 122, and storage 124. The storage 124 includes computer-readable/-writable memory (e.g., random access memory (RAM)).

In some implementations, the database system 106 includes a plurality of tables. In the depicted example, the database system 106 includes a sensor table 130, a sensor property table 132, a data stream weight table 134, a detected value table 136, and a corrected value table 138. An example database system includes the in-memory SAP HANA database system provided by SAP SE of Walldorf, Germany.

To provide further context for implementations of the present disclosure, and as introduced above, accuracy of data provided from sensors in a sensor network (e.g., the sensor network 102) is an important factor. If the collected data is inaccurate, subsequent use of the data can be flawed.

It cannot be guaranteed, however, that all sensors in the sensor network always work well, and continuously collect accurate data. For example, sensor performance may degrade due to a harsh environment, wear, noise, lack of maintenance, and the like.

Figure 2:
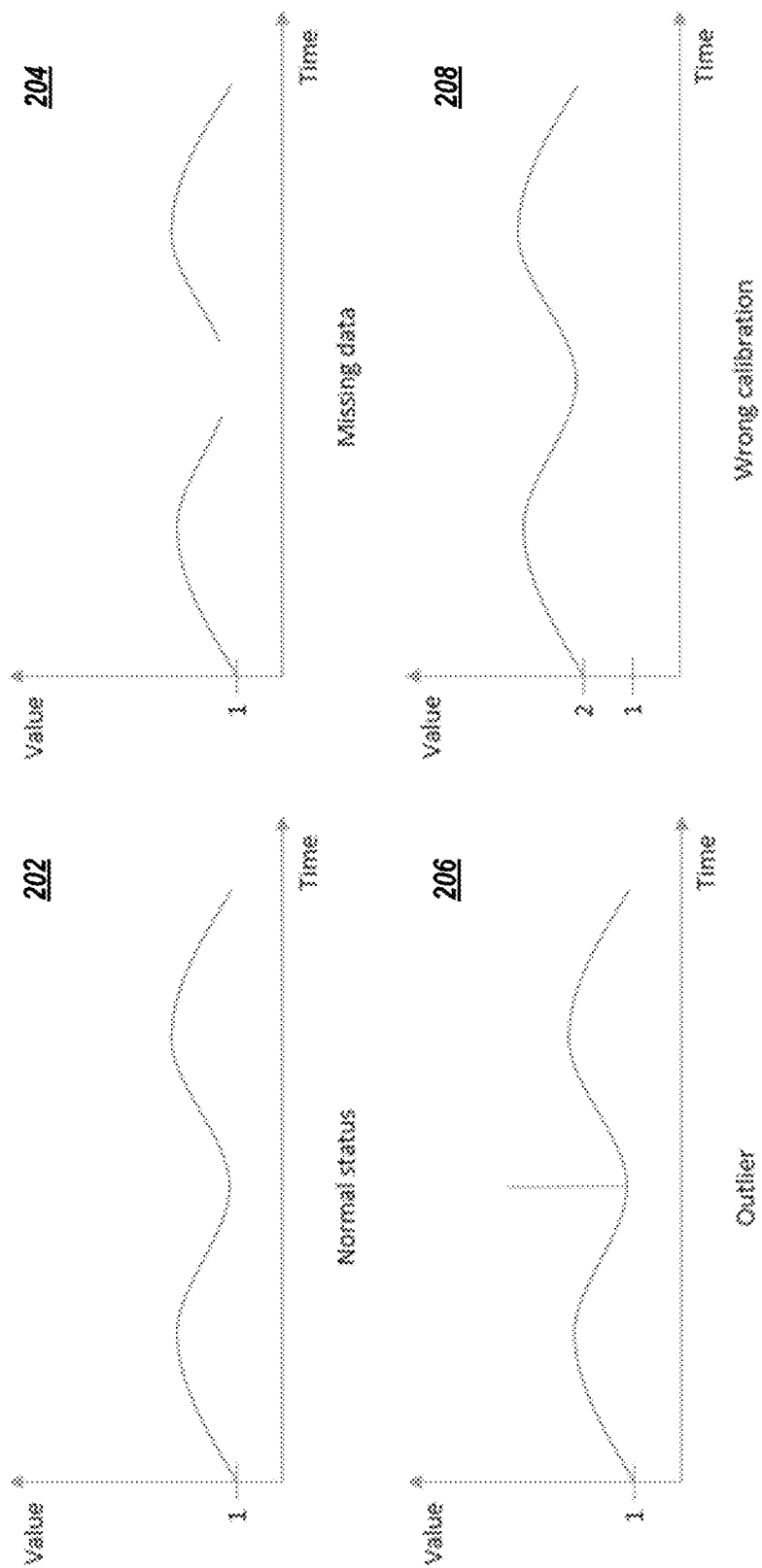
FIG. 2 depicts example graphs illustrating example data errors in sensor networks.

FIG. 2 depicts example graphs illustrating example data errors in sensor networks. A first graph 202 depicts example data collection values for a sensor functioning as expected (e.g., normal status). In some instances, a sensor can suddenly stop collecting data for a period of time. In such instances, it can occur that the sensor can recover itself, and continue to collect data. A second graph 204 depicts such an instance, where there is missing data in the data stream. In some examples, the missing data might be only a few data points (continuous, intermittent), or a numerous data points (continuous, intermittent).

In some instances, a sensor can provide outlier data. For example, an unstable sensor can generate outlier data. Outlier data can include data values that exceed some typical threshold (above, below). A third graph 206 depicts such an instance, where there is a data spike indicating outlier data. In some instances, a sensor can be out of calibration. Consequently, the resulting data stream may have an incorrect baseline. A fourth graph 208 depicts such instances. For example, a temperature sensor is responsive to temperature, but provides data values 2 degrees higher (e.g., the actual temperature is 29 degrees, but the data indicates 31 degrees. In such instances, the data stream appears fine (e.g., there is no missing data or outlier), but the calibration is incorrect. It is contemplated that the above issues are not exclusive. For example, a data stream can have missing data, outlier data, and/or improper calibration.

In view of the foregoing, implementations of the present disclosure provide an intelligent self-correction platform for self-correction of data on multiple data streams in sensor networks. In accordance with implementations of the present disclosure, the self-correction platform of the present disclosure identifies instances of inaccurate data, and automatically corrects inaccuracies to provide accurate data from a sensor network.

As described in further detail herein, implementations of the present disclosure provide an autonomous sensor network (e.g., the sensor network 102 of FIG. 1), which includes multiple sensor nodes (e.g., the sensor nodes 110) that communicate with each other, and that automatically correct faulty data streams. The self-correction platform of the present disclosure provides fault tolerance for continuous missing data, outlier, and/or wrong calibration (e.g., as opposed to fault tolerance for only a single missing data point, or outlier). Further, implementations of the present disclosure enable online self-correction (e.g., real-time self-correction as data is received), as opposed to post hoc offline processing. As used herein, real-time describes actions that can be automatically executed, without requiring human input and without any intentional delay, taking into account any processing limitations of the self-correction platform, and any time required to process data.

In accordance with implementations of the present disclosure, and as described in further detail herein, for each sensor data stream, a correlated data stream, and a set of weights are calculated in real-time. For example, for a data stream of a first sensor can be correlated to a data stream of at least one other sensor. In some examples, the at least one other sensor can be a same type, or different type of sensor. In some examples, the at least one sensor can be at the same location, or different location. For example, a data stream of a first temperature sensor can be correlated to a data stream of a first light intensity sensor that is at the same location as the first temperature sensor. Further, the data stream of the first temperature sensor can be correlated to a data stream of a second temperature sensor that is at a different location. Although geographically adjacent sensors may have correlation, the location and distance is not the only factor relevant to correlation, particularly in complex environment. In order to avoid errors, implementations of the present disclosure calculate correlated data streams, and allocate respective weights to the correlated data streams.

Further, and as also described in detail herein, implementations of the present disclosure predict a correct value for incorrect data points. In some implementations, a first data point is predicted based on history data of the data stream, and a second data point is predicted based on current data points in correlated data streams. Respective weights are determined for the first data point and the second data point, and a combined data point is determined based on a weighted combination of the first data point and the second data point.

An advantage of the combined data point of the present disclosure is that, for some parameters (e.g., temperature, light intensity), the curve of the data stream is relatively smooth. Consequently, time series prediction for a few data points based on history data is relatively accurate. However, the accuracy can decrease dramatically, if time series prediction is over a relatively long time period. Imagine there is missing data for a long time period, since we lose recent data sample, the predicted value for a later point may have a big deviation. In such cases, reliance is on the current data in the correlated data streams to predict the missing data, which overcomes deficiencies in the lack of sample data.

Implementations of the present disclosure are described in further detail herein with reference to the following example notations:

TABLE 1

Notations

| Notation | Description |
|---|---|
| $S_i$ | Sensor i<br>i = 1, 2, ..., N |
| T | Current timestamp |
| T − 1 | Previous timestamp |
| $D_{ij}$ | Detected data value from sensor i at time stamp j<br>i = 1, 2, ..., N<br>j = 1, 2, ..., T |
| $A_{ij}$ | Predicted data value based on history data for sensor i at timestamp j<br>i = 1, 2, ..., N<br>j = 1, 2, ..., T |
| $B_{ij}$ | Predicted data value based on current data in correlated data streams for sensor i at timestamp j<br>i = 1, 2, ..., N<br>j = 1, 2, ..., T |
| $P_{ij}$ | Combined predicted data value for sensor i at timestamp j<br>i = 1, 2, ..., N<br>j = 1, 2, ..., T |
| $C_{ij}$ | Corrected data value for sensor i at timestamp j<br>i = 1, 2, ..., N<br>j = 1, 2, ..., T |
| $H_i$ | Delta threshold of sensor i<br>i = 1, 2, ..., N |
| $W_{ik}$ | Weight of sensor k to sensor i, $W_{i0}$ is constant<br>i = 1, 2, ..., N<br>k = 0, 1, 2, ..., i − 1, i + 1, ..., N |
| $E_i$ | Weight of predicted data value based on history data for sensor i<br>i = 1, 2, ..., N |
| $F_i$ | Weight of predicted data value based on current data in correlated data streams for sensor i, $E_i + F_i = 1$<br>i = 1, 2, ..., N |

Accordingly, there are N sensors $S_i$, i=1, 2, ..., N in the sensor network (e.g., sensors 112 of the sensor network 102 of FIG. 1). Each sensor continuously detects a value $D_{ij}$ (e.g., temperature, pressure, light intensity). Sometimes the sensor may fail to correctly detect one value, or a batch of values (e.g., due to harsh environment, noise). In this case, $D_{ij}$ may be null, because of missing data, or $D_{ij}$ is not correct due to outlier or wrong calibration. Consequently, the problem arises, which is addressed by the present disclosure, as to how to automatically detect and correct the wrong data points, or missing data points in the sensor network.

Referring again to FIG. 1, and as noted above, there are multiple sensor nodes 110 in the sensor network 102. The sensor nodes 110 are connected for communication over any appropriate wireless network in a topology. Within each sensor node 110, the sensor 112 is responsive to an environment, and provides a data stream representative of a parameter (e.g., temperature, humidity, light intensity, atmospheric pressure, velocity, acceleration). As discussed above, the computing module 116 (e.g., processor) can transform the incoming data stream from a first format to a second format, the storage 118 at least temporarily stores the transformed data, and the communication module 114 transmits the stored data to other sensor nodes 110, and/or the gateway 104.

In some implementations, the gateway 104 functions as a data hub, and bridge between the sensor network 102, and the database system 106. In some examples, the communication module 120 receives data (data streams) from the sensor network 102. The data can be considered raw data, which can include correct data, missing data, outlier data, and the like. In some examples, the computing module 122 detects missing data, and/or wrong data, and provides data correction based on the combined predicted data value, as described herein. In some examples, the storage 124 stores the raw data, and the corrected data. The gateway 104 provides data to the database system 106 to update the tables stored therein.

As introduced above, the database system 106 stores tables including the sensor table 130, the sensor property table 132, the data stream weight table 134, the detected value table 136, and the corrected value table 138. In some examples, the sensor table 130 stores information associated with respective sensor nodes 110. Example information includes, without limitation, sensor identifier, name, and detected parameter. In some examples, the sensor property table 132 stores property information associated with respective sensor nodes 110. Example property information includes, without limitation, delta threshold, history data weight, and correlated data weight. In some examples, the data stream weight table 134 stores, for each sensor, any correlated data streams (sensors), and their respective weights. In some examples, the detected value table 136 stores the detected data values of respective sensors with timestamps. The detected value may be correct, missing, or an outlier. In some examples, the corrected value table 138 stores corrected data values of respective sensors with timestamp. In some examples, if the detected value is correct, the corrected value equals the detected value. The following are examples of the respective tables:

TABLE 2

Sensor Table

| Column Name | Description |
|---|---|
| ID | Identifier of sensor |
| Name | Name of sensor |
| Parameter | Detected parameter |
| Unit | Unit of measurement |

TABLE 3

Sensor Property Table

| Column Name | Description |
|---|---|
| ID | Identity of sensor |
| Delta threshold | Delta threshold of sensor |
| History data weight | History data weight of sensor |
| Correlated data weight | Correlated data weight of sensor |

TABLE 4

Data Stream Weight Table

| Column name | Description |
|---|---|
| To_ID | Weight for data stream (sensor) |
| From_ID | Weight for data stream (sensor) |
| Weight | Weight value |

TABLE 5

Detected Value Table

| Column name | Description |
|---|---|
| ID | Identity of sensor |
| D_Value | Detected value |
| Timestamp | Timestamp of detected value |

TABLE 6

Corrected Value Table

| Column Name | Description |
|---|---|
| ID | Identity of sensor |
| C_Value | Corrected value |
| Timestamp | Timestamp of corrected value |

In summary, all sensor nodes 110 in the sensor network 102 collect data, transform data, and transfer data to the gateway 104 (e.g., directly, or indirectly through other sensor nodes 110). The gateway 104 detects missing data, outlier, and/or wrong calibration, corrects any wrong data values, and fills in any missing data values. The gateway 104 updates tables in the database system 106. In some examples, the gateway 104 performs these operations in parallel at a current timestamp T, for each sensor data stream $S_i$, and current detected data value $D_{iT}$.

In further detail, as data values are received from sensor nodes 110, the gateway 104 checks the correctness of the current detected data value $D_{iT}$. That is, the gateway 102 detects whether there is incorrect, and/or missing data in the incoming data streams. In accordance with implementations of the present disclosure, the current detected data point value $D_{iT}$ is checked for correctness. In some implementations, to check for correctness, a predicted data value (A) is determined for a respective data stream (and, thus, sensor) based on historical data of the data stream. The predicted data value can be determined based on the following example relationship:

$$A_{iT} = \frac{\sum_{j=1}^{N} C_{i(T-j)}}{N} \quad (1)$$

A predicted data value (B) is determined based on current data points in one or more correlated data streams. The predicted data value can be determined based on the following example relationship:

$$B_{iT} = W_{i0} + \Sigma_{k=1}^{N} W_{ik} D_{kT} (k \neq i) \quad (2)$$

In accordance with implementations of the present disclosure, for each data stream, a respective weight of other data streams is determined. For example, a light sensor, a ultra-violet ray (UV) sensor, a temperature sensor, and a pressure sensor can each be provided. Relative weights of the respective sensors are provided based on the respective values, regardless of the disparate units of measure. For example, and relative to the light sensor, the weights of the UV data, the temperature data, and the pressure data may be 0.9, 0.1, 0, respectively, indicating that the UV data has a higher correlation to the light data, than does temperature data, or pressure data.

In some examples, a combined predicted value (P) is determined for the subject data stream as a weighted combination of the predicted data values (A, B). The combined predicted data value can be determined based on the following example relationship:

$$P_{iT} = E_i A_{iT} + F_i B_{iT} \quad (3)$$

The current detected data value $D_{iT}$ is compared to the combined predicted data $P_{iT}$ to determine whether the detected data value $D_{iT}$ is correct, or missing. In some examples, a delta threshold (H) for the particular sensor is provided, and a relative degree of distance between the current detected data point value $D_{iT}$ and the combined predicted data $P_{iT}$ is determined. In some examples, if $(1-H_i)P_{iT} \leq D_{iT} \leq (1+H_i)P_{iT}$, the current data value $D_{iT}$ is correct. Consequently, a corrected data value $C_{iT}$ is set equal to the current detected data value $D_{iT}$, the next, incoming detected data value is checked. If the current detected data value $D_{iT}$ is null, which means the current data value is missing, the corrected data value $C_{iT}$ is set equal to the combined predicted data value $P_{iT}$. In some examples, if $(1-H_i)P_{iT} > D_{iT} > (1+H_i)P_{iT}$, the corrected data value $C_{iT}$ is set equal to the combined predicted data value $P_{iT}$.

In some implementations, after the current detected data point value $D_{iT}$ is checked, and corrected, if need be, the following properties are updated: weight (E) of predicted value based on history data; weight (F) of predicted value based on current data in correlated data streams; and data stream weight (W). In some examples, the weight (E) of predicted value based on history data is updated based on the following example relationship:

$$E_i = \frac{|B_{iT} - C_{iT}|}{|B_{iT} - C_{iT}| + |A_{iT} - C_{iT}|} \quad (4)$$

In some examples, the weight (F) of predicted value based on current data in correlated data streams is updated based on the following example relationship:

$$F_i = 1 - E_i \quad (5)$$

In some examples, the data stream weight (W) is updated based on the following example relationships:

$$\begin{cases} C_{iT} = W_{i0} + W_{i1}C_{1T} + \ldots + W_{i(i-1)}C_{(i-1)T} + W_{i(i+1)}C_{(i+1)T} + \ldots + W_{iN}C_{NT} \\ C_{i(T-1)} = W_{i0} + W_{i1}C_{1(T-1)} + \ldots + W_{i(i-1)}C_{(i-1)(T-1)} + \\ \quad W_{i(i+1)}C_{(i+1)(T-1)} + \ldots + W_{iN}C_{N(T-1)} \\ \ldots \\ C_{i(T-N+1)} = W_{i0} + W_{i1}C_{1(T-N+1)} + \ldots + \\ \quad W_{i(i-1)}C_{(i-1)(T-N+1)} + W_{i(i+1)}C_{(i+1)(T-N+1)} + \ldots + W_{iN}C_{N(T-N+1)} \end{cases}$$

In some examples, the data stream weight (W) is iteratively adjusted such that each of the above equations turns out true. For example, a room can include a temperature sensor that is responsive to temperature in the room, and a speed sensor that is responsive to a rotational speed (e.g., measured in revolutions per minute (RPM)) of a fan in the room. In this example, a correlated temperature value can be determined from the fan speed based on the following example equation:

$$T = 30 - 0.01 \text{ (RPM)}$$

The following example temperature values can be provided for respective times based on the above equation:

| Time | Temperature | RPM |
|---|---|---|
| T1 | 28.9 | 110 |
| T2 | 29 | 100 |
| T3 | 28.9 | 105 |

In this example, N=2 (two sensors), and the time window is 2. Consequently, when Time=T2, W0 and W1 can be calculated using values from the table above. For example:

$$29 = W0 + W1*100 \text{ and } 28.9 = W0 + W1*110$$

This results in W0=30, and W1=−0.01. When Time=T3, W0 and W1 can be calculated as:

$$28.9 = W0 + W1*105 \text{ and } 29 = W0 + W1*100$$

This results in W0=31, and W1=−0.02.

In some implementations, the sensor property table, the data stream weight table, the detected value table, and the corrected data value table are updated. In some examples, the sensor property table is updated with $E_i$ and $F_i$, the data stream weight table is updated with $W_{ik}$, the detected data value table is updated with $D_{iT}$, and the corrected data value table is updated with $C_{iT}$.

Figure 3:
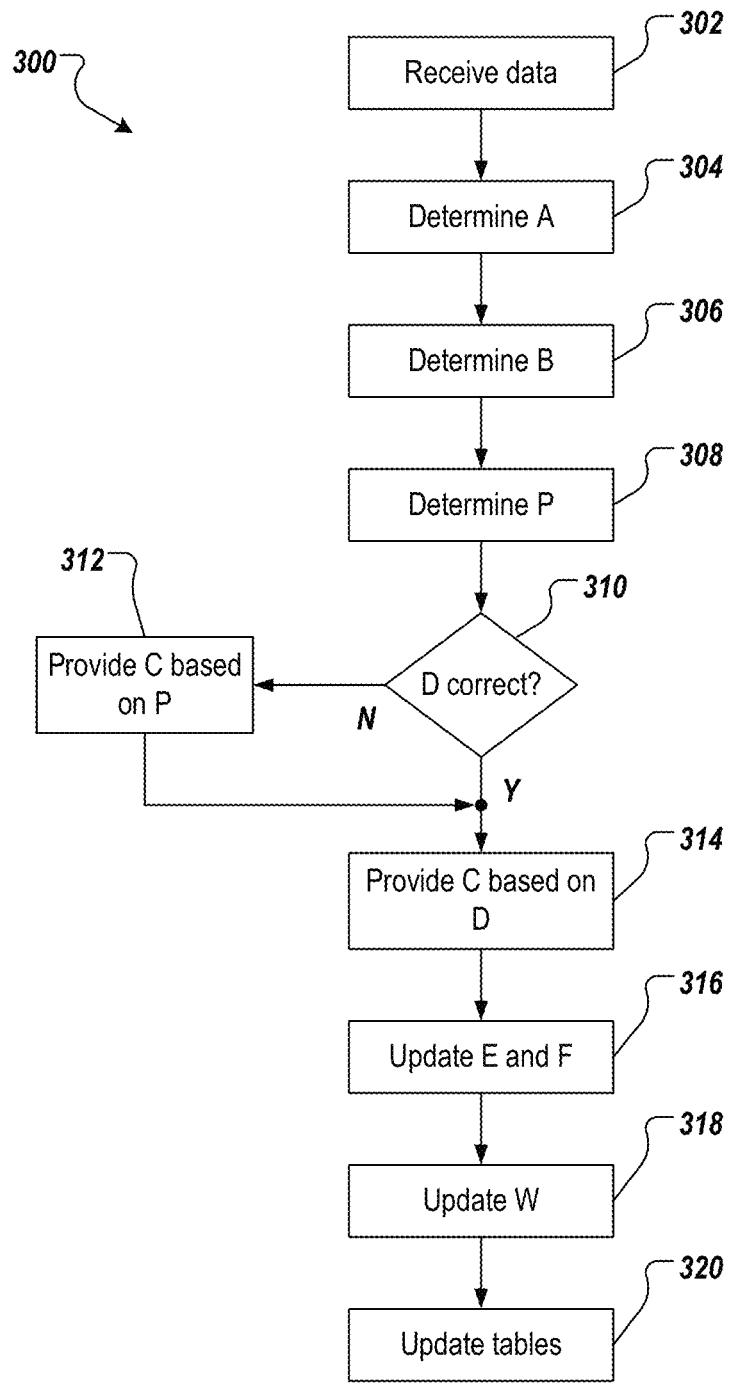
FIG. 3 depicts an example process that can be executed in accordance with implementations of the present disclosure.

FIG. 3 depicts an example process 300 that can be executed in accordance with implementations of the present disclosure. In some implementations, the example process 300 may be performed using one or more computer-executable programs executed using one or more computing devices. In some examples, the example process 300 is performed in parallel for each data stream of a sensor network.

Data is received (302). For example, a gateway (e.g., the gateway 104 of FIG. 1) receives data from a sensor network (e.g., the sensor network 102), the data being included in a data stream of a sensor within the sensor network. The data is received at a current time T, and is from a respective sensor data stream $S_i$ (e.g., sensor). A predicted data value (A) is determined based on historical data for the respective sensor (304). For example, the predicted data value $A_{iT}$ is determined based on Equation 1, above. A predicted data value (B) is determined based on correlated data streams (306). For example, the predicted data value $B_{iT}$ is determined based on Equation 2, above. A combined predicted data value (P) is determined (308). For example, the combined predicted data value $P_{iT}$ is determined based on Equation 3, above.

It is determined whether the current detected data value ($D_{iT}$) is correct (310). For example, and as described above, if $(1-H_i)P_{iT} \leq D_{iT} \leq (1+H_i)P_{iT}$, the current data value $D_{iT}$ is correct. However, if the current detected data value $D_{iT}$ is null, which means the current data value is missing, or, if $(1-H_i)P_{iT} > D_{iT} > (1+H_i)P_{iT}$, the current detected data value $D_{iT}$ is not correct. If the current detected data value ($D_{iT}$) is not correct, a corrected data value (C) is provide based on the predicted data value (P) (312). For example, the corrected data value $C_{iT}$ is set equal to the combined predicted data value $P_{iT}$. If the current detected data value ($D_{iT}$) is correct, the corrected data value (C) is provided based on the current detected data value ($D_{iT}$) (314). For example, corrected data value $C_{iT}$ is set equal to the current detected value $D_{iT}$. As described herein, the weights E and F are updated (316), the weight W is updated (318), and the tables are updated (320).

Figure 4:
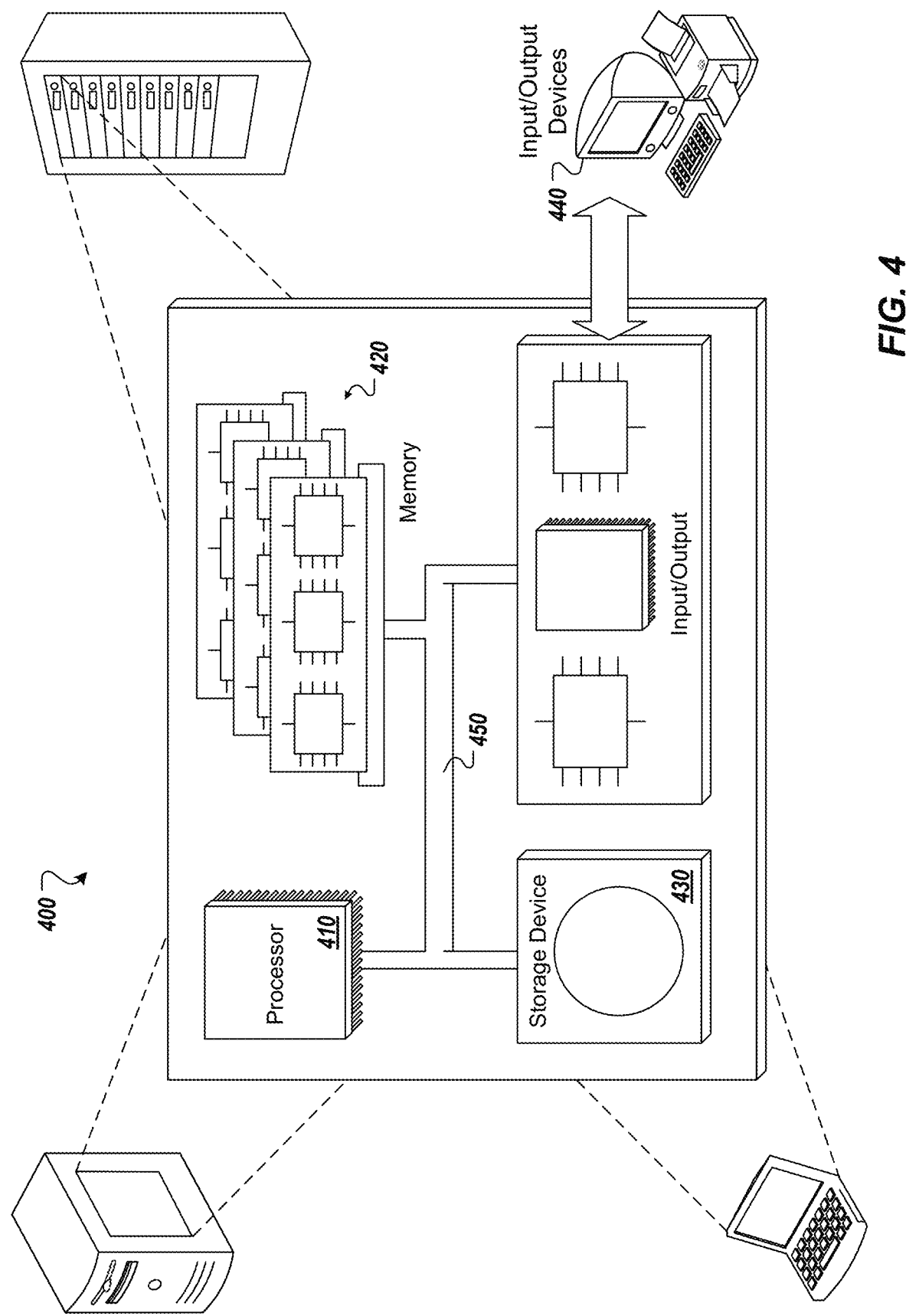
FIG. 4 is a schematic illustration of example computer systems that can be used to execute implementations of the present disclosure.

FIG. 4 depicts a schematic diagram of an example computing system 400. The system 400 may be used to perform the operations described with regard to one or more implementations of the present disclosure. For example, the system 400 may be included in any or all of the server components, or other computing device(s), discussed herein. The system 400 may include one or more processors 410, one or more memories 420, one or more storage devices 430, and one or more input/output (I/O) devices 440. The components 410, 420, 430, 440 may be interconnected using a system bus 450.

The processor 410 may be configured to execute instructions within the system 400. The processor 410 may include a single-threaded processor or a multi-threaded processor. The processor 410 may be configured to execute or otherwise process instructions stored in one or both of the memory 420 or the storage device 430. Execution of the instruction(s) may cause graphical information to be displayed or otherwise presented via a user interface on the I/O device 440.

The memory 420 may store information within the system 400. In some implementations, the memory 420 is a computer-readable medium. In some implementations, the memory 420 may include one or more volatile memory units. In some implementations, the memory 420 may include one or more non-volatile memory units.

The storage device 430 may be configured to provide mass storage for the system 400. In some implementations, the storage device 430 is a computer-readable medium. The storage device 430 may include a floppy disk device, a hard disk device, an optical disk device, a tape device, or other type of storage device. The I/O device 440 may provide I/O operations for the system 400. In some implementations, the I/O device 440 may include a keyboard, a pointing device, or other devices for data input. In some implementations, the I/O device 440 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors for self- detection and self-correction of data errors in sensor networks, the method comprising:

receiving, by the one or more processors, a first current detected data value for a first sensor of a sensor network comprising multiple sensors;

determining, by the one or more processors, a first predicted data value based on historical data values of the first sensor, and a second predicted data value based on a second current detected data value for a second sensor of the sensor network;

providing, by the one or more processors, a combined predicted data value based on the first predicted data value, and the second predicted data value;

comparing, by the one or more processors, the first current detected data value and the combined predicted data value to provide a comparison; and determining, by the one or more processors, a first corrected data value for the first sensor.

2. The method of claim 1, wherein the comparison indicates whether the first current detected data value is correct, and is based on a delta threshold that is specific to the first sensor.

3. The method of claim 1, wherein the first corrected data value is set equal to the first current detected data value in response to determining that the comparison indicates that the first current detected data value is correct.

4. The method of claim 1, wherein the first corrected data value is set equal to the combined predicted data value in response to determining that the comparison indicates that the first current detected data value is one or incorrect and missing.

5. The method of claim 1, wherein a data stream of the second sensor is correlated to a data stream of the first sensor, and the second sensor is at a location that is different from a location of the first sensor.

6. The method of claim 1, wherein a gateway receives the first current detected data value from the sensor network, and determines the first corrected data value for the first sensor.

7. The method of claim 1, wherein the sensor network comprises a network of Internet-of-Things (IoT) devices.

8. A non-transitory computer-readable storage medium coupled to one or more processors and having instructions stored thereon which, when executed by the one or more processors, cause the one or more processors to perform operations for self- detection and self-correction of data errors in sensor networks, the operations comprising:

receiving a first current detected data value for a first sensor of a sensor network comprising multiple sensors;

determining a first predicted data value based on historical data values of the first sensor, and a second predicted data value based on a second current detected data value for a second sensor of the sensor network;

providing a combined predicted data value based on the first predicted data value, and the second predicted data value;

comparing the first current detected data value and the combined predicted data value to provide a comparison; and determining a first corrected data value for the first sensor.

9. The computer-readable storage medium of claim 8, wherein the comparison indicates whether the first current detected data value is correct, and is based on a delta threshold that is specific to the first sensor.

10. The computer-readable storage medium of claim 8, wherein the first corrected data value is set equal to the first current detected data value in response to determining that the comparison indicates that the first current detected data value is correct.

11. The computer-readable storage medium of claim 8, wherein the first corrected data value is set equal to the combined predicted data value in response to determining that the comparison indicates that the first current detected data value is one or incorrect and missing.

12. The computer-readable storage medium of claim 8, wherein a data stream of the second sensor is correlated to a data stream of the first sensor, and the second sensor is at a location that is different from a location of the first sensor.

13. The computer-readable storage medium of claim 8, wherein a gateway receives the first current detected data value from the sensor network, and determines the first corrected data value for the first sensor.

14. The computer-readable storage medium of claim 8, wherein the sensor network comprises a network of Internet-of-Things (IoT) devices.

15. A system, comprising:
a computing device; and
a computer-readable storage device coupled to the computing device and having instructions stored thereon which, when executed by the computing device, cause the computing device to perform operations for self-detection and self-correction of data errors in sensor networks, the operations comprising:

receiving a first current detected data value for a first sensor of a sensor network comprising multiple sensors;

determining a first predicted data value based on historical data values of the first sensor, and a second predicted data value based on a second current detected data value for a second sensor of the sensor network;

providing a combined predicted data value based on the first predicted data value, and the second predicted data value;

comparing the first current detected data value and the combined predicted data value to provide a comparison; and determining a first corrected data value for the first sensor.

16. The system of claim 15, wherein the comparison indicates whether the first current detected data value is correct, and is based on a delta threshold that is specific to the first sensor.

17. The system of claim 15, wherein the first corrected data value is set equal to the first current detected data value in response to determining that the comparison indicates that the first current detected data value is correct.

18. The system of claim 15, wherein the first corrected data value is set equal to the combined predicted data value in response to determining that the comparison indicates that the first current detected data value is one or incorrect and missing.

19. The system of claim 15, wherein a data stream of the second sensor is correlated to a data stream of the first sensor, and the second sensor is at a location that is different from a location of the first sensor.

20. The system of claim 15, wherein a gateway receives the first current detected data value from the sensor network, and determines the first corrected data value for the first sensor.

* * * * *